(12) United States Patent
Templeton et al.

(10) Patent No.: US 8,515,871 B2
(45) Date of Patent: *Aug. 20, 2013

(54) AUTHORIZING USE OF A FINANCIAL INSTRUMENT

(75) Inventors: James E. Templeton, San Jose, CA (US); Sanjay Bhargava, San Carlos, CA (US)

(73) Assignee: PayPal Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,398

(22) Filed: Nov. 8, 2011
(Under 37 CFR 1.47)

(65) Prior Publication Data
US 2012/0054103 A1 Mar. 1, 2012

Related U.S. Application Data

(63) Continuation of application No. 12/198,575, filed on Aug. 26, 2008, now Pat. No. 8,296,204, which is a continuation of application No. 09/901,594, filed on Jul. 11, 2001, now Pat. No. 6,461,110.

(51) Int. Cl.
*G06Q 40/00* (2012.01)

(52) U.S. Cl.
USPC .................. 705/44; 705/39; 705/40; 705/41; 705/42; 705/43

(58) Field of Classification Search
USPC ............................. 705/39, 40, 41, 42, 43, 44
See application file for complete search history.

(56) References Cited

U.S. PATENT DOCUMENTS

| 3,823,308 A | 7/1974 | Goldberg |
| 3,852,571 A | 12/1974 | Hall |
| 3,896,266 A | 7/1975 | Waterbury |
| 4,471,216 A | 9/1984 | Herve |
| 5,053,606 A | 10/1991 | Kimizu |
| 5,416,306 A | 5/1995 | Imahata |
| 5,532,464 A | 7/1996 | Josephson |
| 5,679,938 A | 10/1997 | Templeton |
| 5,708,422 A | 1/1998 | Blonder et al. |

(Continued)

FOREIGN PATENT DOCUMENTS

| AU | 199928111 B2 | 2/2000 |
| AU | 200197079 B2 | 6/2002 |

(Continued)

OTHER PUBLICATIONS

U.S. Appl. No. 09/901,954, Advisory Action mailed Mar. 3, 2006, 3 pgs.

(Continued)

*Primary Examiner* — Nga B. Nguyen
(74) *Attorney, Agent, or Firm* — Schwegman Lundberg & Woessner, P.A.

(57) ABSTRACT

Computer-implemented method and system are provided for verifying a financial instrument. The method comprises receiving, via a user interface, the identification of one or more financial instruments. A transaction processor initiates at least one transaction using a variable detail and saves the variable detail in a database as a stored detail. A requested detail relating to the at least one transaction is received via the user interface and the transaction processor compares the stored detail with the requested detail. The use of the financial instrument is authorized if stored detail matches the requested detail.

20 Claims, 2 Drawing Sheets

(56) References Cited

U.S. PATENT DOCUMENTS

| | | | |
|---|---|---|---|
| 5,750,972 | A | 5/1998 | Botvin |
| 5,770,843 | A | 6/1998 | Rose |
| 5,778,178 | A | 7/1998 | Arunachalam |
| 5,793,028 | A | 8/1998 | Wagener |
| 5,870,456 | A | 2/1999 | Rogers |
| 5,877,482 | A | 3/1999 | Reilly |
| 5,883,810 | A | 3/1999 | Franklin et al. |
| 5,903,878 | A | 5/1999 | Talati et al. |
| 5,907,801 | A | 5/1999 | Albert |
| 5,907,832 | A | 5/1999 | Pieterse |
| 5,963,917 | A | 10/1999 | Ogram |
| 5,987,500 | A | 11/1999 | Arunachalam |
| 6,029,150 | A | 2/2000 | Kravitz |
| 6,052,675 | A | 4/2000 | Checchio |
| 6,212,556 | B1 | 4/2001 | Arunachalam |
| 6,226,624 | B1 | 5/2001 | Watson et al. |
| 6,497,359 | B1 | 12/2002 | Chihara |
| 6,836,765 | B1 | 12/2004 | Sussman |
| 7,430,537 | B2 * | 9/2008 | Templeton et al. ............. 705/39 |
| 8,024,260 | B1 | 9/2011 | Hogl et al. |
| 8,296,204 | B2 | 10/2012 | Templeton et al. |
| 8,301,556 | B2 | 10/2012 | Hogl et al. |
| 2002/0077837 | A1 | 6/2002 | Krueger et al. |
| 2008/0312998 | A1 | 12/2008 | Templeton et al. |
| 2012/0030096 | A1 | 2/2012 | Hogl et al. |
| 2012/0054104 | A1 | 3/2012 | Templeton et al. |
| 2012/0109823 | A1 | 5/2012 | Templeton et al. |
| 2013/0006864 | A1 | 1/2013 | Hogl et al. |

FOREIGN PATENT DOCUMENTS

| | | |
|---|---|---|
| DE | 4425271 A1 | 1/1996 |
| DE | 19628045 A1 | 1/1998 |
| DE | 19634418 A1 | 3/1998 |
| DE | 19926472 A1 | 12/2000 |
| DE | 10022973 A1 | 2/2001 |
| EP | 0519843 A3 | 12/1992 |
| EP | 0527639 A2 | 2/1993 |
| EP | 0216521 B1 | 11/1993 |
| EP | 0400911 B1 | 11/1996 |
| EP | 0848360 A1 | 6/1998 |
| JP | 2004519748 A | 7/2004 |
| JP | 2008257747 A | 10/2008 |
| JP | 2010124604 A | 6/2010 |
| JP | 5005871 B2 | 6/2012 |
| JP | 2012128885 A | 7/2012 |
| WO | WO-9506294 A1 | 3/1995 |
| WO | WO-9516971 A1 | 6/1995 |
| WO | WO-9638813 A1 | 12/1996 |
| WO | WO-9710560 A1 | 3/1997 |
| WO | WO-9713228 A1 | 4/1997 |
| WO | WO-9908242 A1 | 2/1999 |
| WO | WO-9923622 A1 | 5/1999 |
| WO | WO-9966436 A1 | 12/1999 |
| WO | WO-0077754 A1 | 12/2000 |
| WO | WO-0205224 A2 | 1/2002 |
| WO | WO-0205224 A3 | 1/2002 |

OTHER PUBLICATIONS

U.S. Appl. No. 09/901,954, Advisory Action mailed Sep. 6, 2007, 3 pgs.
U.S. Appl. No. 09/901,954, Appeal Brief filed May 11, 2006, 30 pgs.
U.S. Appl. No. 09/901,954, Examiner Interview Summary mailed Jan. 21, 2005, 3 pgs.
U.S. Appl. No. 09/901,954, Examiner Interview Summary mailed Feb. 5, 2008, 2 pgs.
U.S. Appl. No. 09/901,954, Final Office Action mailed Jul. 10, 2007, 11 pgs.
U.S. Appl. No. 09/901,954, Final Office Action mailed Dec. 19, 2005, 11 pgs.
U.S. Appl. No. 09/901,954, Non Final Office Action mailed Jan. 21, 2005, 10 pgs.
U.S. Appl. No. 09/901,954, Non Final Office Action mailed Feb. 13, 2007, 11 pgs.
U.S. Appl. No. 09/901,954, Non Final Office Action mailed Dec. 19, 2007, 10 pgs.
U.S. Appl. No. 09/901,954, Notice of Allowance mailed Jun. 19, 2008, 10 pgs.
U.S. Appl. No. 09/901,954, Response filed Jan. 18, 2008 to Non Final Office Action mailed Dec. 19, 2007, 11 pgs.
U.S. Appl. No. 09/901,954, Response filed Jan. 26, 2006 to Final Office Action mailed Dec. 9, 2005, 18 pgs.
U.S. Appl. No. 09/901,954, Response filed Feb. 28, 2005 to Non Final Office Action mailed Jan. 21, 2005, 15 pgs.
U.S. Appl. No. 09/901,954, Response filed Mar. 14, 2006 to Advisory Action mailed Mar. 3, 2006, 3 pgs.
U.S. Appl. No. 09/901,954, Response filed Mar. 27, 2007 to Non Final Office Action mailed Feb. 13, 2007, 19 pgs.
U.S. Appl. No. 09/901,954, Response filed Aug. 20, 2007 to Final Office Action mailed Jul. 10, 2007, 20 pgs.
U.S. Appl. No. 10/018,237, Advisory Action mailed Feb. 9, 2009, 4 pgs.
U.S. Appl. No. 10/018,237, Advisory Action mailed Sep. 20, 2007, 3 pgs.
U.S. Appl. No. 10/018,237, Appeal Brief filed Feb. 24, 2009, 27 pgs.
U.S. Appl. No. 10/018,237, Appeal Brief mailed Oct. 29, 2007, 15 pgs.
U.S. Appl. No. 10/018,237, Final Office Action mailed Apr. 4, 2007, 11 pgs.
U.S. Appl. No. 10/018,237, Final Office Action mailed Sep. 8, 2008, 13 pgs.
U.S. Appl. No. 10/018,237, Non Final Office Action mailed Aug. 3, 2006, 17 pgs.
U.S. Appl. No. 10/018,237, Non-Final Office Action mailed Mar. 27, 2008, 3 pgs.
U.S. Appl. No. 10/018,237, Notice of Allowance mailed May 13, 2011, 9 pgs.
U.S. Appl. No. 10/018,237, Preliminary Amendment mailed May 31, 2006, 6 pgs.
U.S. Appl. No. 10/018,237, Reply Brief filed Sep. 15, 2009, 8 pgs.
U.S. Appl. No. 10/018,237, Response filed Jan. 3, 2007 to Non Final Office Action mailed Aug. 3, 2006, 8 pgs.
U.S. Appl. No. 10/018,237, Response filed Jun. 27, 2008 to Non-Final Office Action mailed Mar. 27, 2008, 11 pgs.
U.S. Appl. No. 10/018,237, Response filed Aug. 6, 2007 to Final Office Action mailed Apr. 4, 2007, 6 pgs.
U.S. Appl. No. 10/018,237, Response filed Dec. 16, 2008 to Final Office Action mailed Sep. 8, 2008, 13 pgs.
U.S. Appl. No. 10/018,237, Supplemental Appeal Brief filed Ape. 14, 2009, 27 pgs.
Australian Application No. 2008203005, Examiner's First Report on Patentability mailed Oct. 29, 2008, 4 pgs.
Australian Application Serial No. 2001271968, Amended Statement of Grounds of Opposition and Particulars Related to Each Ground mailed Feb. 11, 2008, 11 pgs.
Australian Application Serial No. 2001271968, Letter from Examiner mailed Nov. 19, 2007, 2 pgs.
Australian Application Serial No. 2001271968, Letter to Examiner Dec. 17, 2007, 1 pgs.
Australian Application Serial No. 2001271968, Letter to examiner mailed Oct. 15, 2007, 2 pgs.
Australian Application Serial No. 2001271968, Notice of Acceptance mailed Mar. 2, 2007, 3 pgs.
Australian Application Serial No. 2001271968, Notice of Opposition mailed Jun. 15, 2007, 1 pgs.
Australian Application Serial No. 2001271968, Office Action mailed Nov. 15, 2005, 2 pgs.
Australian Application Serial No. 2001271968, Office Action mailed Nov. 21, 2006, 2 pgs.
Australian Application Serial No. 2001271968, Response filed Jan. 11, 2007 to Office Action mailed Nov. 21, 2006, 23 pgs.
Australian Application Serial. No. 2001271968, Response filed Jan. 25, 2008 to Statement of Grounds and Particulars mailed Jan. 10, 2008, 2 pgs.
Australian Application Serial No. 2001271968, Response filed Oct. 12, 2006 to Office Action mailed Nov. 15, 2005, 20 pgs.

Australian Application Serial No. 2001271968, Statement of Grounds of Opposition and Particulars Relating to Each Ground mailed Sep. 17, 2007, 8 pgs.

Australian Application Serial No. 2001271968, Supplemental Response filed Oct. 25, 2006 to Office Action mailed Nov. 15, 2005, 17 pgs.

Australian Application Serial No. 2008203005, Response filed Aug. 10, 2009 to Office Action mailed Oct. 29, 2008, 2 pgs.

Canadian Application Serial No. 2,412,184, Response filed Feb. 29, 2008 to Office Action mailed Aug. 31, 2007, 21 pgs.

Canadian Application Serial No. 2,412,184, Office Action mailed Jan. 3, 2007, 5 pgs.

Canadian Application Serial No. 2,412,184, Office Action mailed Aug. 31, 2007, 5 pgs.

Canadian Application Serial No. 2,412,184, Response filed May 30, 2007 to Office Action mailed Jan. 3, 2007, 16 pgs.

European Application Serial No. 00942046.4-2221, Office Action mailed Apr. 30, 2007, w/translation, 6 pgs.

European Application Serial No. 00942046.4-2221, Response filed Oct. 31, 2007 to Office Action mailed Apr. 30, 2007, 10 pgs.

European Application Serial No. 00942046.4-2221, Summons to Attend Oral Proceedings mailed Mar. 3, 2010, 3 pgs.

European Application Serial No. 00942046.4-2221, Written Statements Filed Nov. 30, 2010, 31 pgs.

European Application Serial No. 01951030.4, Office Action mailed Jan. 20, 2006, 15 pgs.

European Application Serial No. 01951030.4, Response filed Mar. 30, 2006 to Office Action mailed Jan. 20, 2006, 9 pgs.

European Application Serial No. 01951030.4, Summons to Attend Oral Proceedings mailed Jul. 21, 2008, 7 pgs.

European Application Serial No. 10158849.9, Extended European Office Action mailed Jun. 18, 2010, 7 pgs.

European Application Serial No. 10158849.9, Response filed Jan. 20, 2011 to EP Search Report mailed Jun. 18, 2010, 4 pgs.

International Application Serial No. PCT/EP00/05359, International Search Report mailed Nov. 16, 2000, 2 pgs.

International Application Serial No. PCT/US01/21725, International Preliminary Examination Report mailed Dec. 10, 2004, 5 pgs.

International Application Serial No. PCT/US01/21725, International Search Report mailed Aug. 22, 2002, 3 pgs.

International Application Serial No. PCT/US01/21725, Written Opinion mailed Aug. 24, 2004, 4 pgs.

Japanese Application Serial No. 2002-508754, Office Action mailed May 30, 2011, 7 pgs.

Japanese Application Serial No. 2002-508754, Preliminary Amendment mailed Jul. 2, 2008, 14 pgs.

Japanese Application Serial No. 2008-173992, Office Action mailed May 18, 2011, 3 pgs.

Automated Clearing House Rules, "A Complete Guide to Rules and Regulations Governing the ACH Network", The National Automed Clearing House Assocation, Herndon VA., (1999), OR 4, OR 10, OG 19, OG 46-48.

Automated Clearing House Rules, "A Complete Guide to Rules and Regulations Governing the ACH Network", The National Automed Clearing House Assocation, Herndon VA., (1999).

Horne, Doak D., "Letter from Gowling Lafleur Henderson LLP to Park, Vaughan and Fleming LLP, Jul. 21, 2004".

Oregon Department of Revenue, "ACH Debit Electronic Funds Transfer: Program Guide", [Online]. Retrieved from the Internet: <URL: http://www.dor.state.or.us/19forms/206-029.pdf>, (Feb. 1999).

Telstra Corporation Ltd, "Australian Application Serial No. 2001271968, Statment of Grounds of Opposition and Particulars Relating to Each Ground in the Matter of Opposition to in the name of PayPal, Inc. mailed Sep. 17, 2007".

U.S. Appl. No. 10/018,237, Examiners Answer to Appeal Brief mailed Jul. 15, 2010, 13 pgs.

U.S. Appl. No. 12/198,575, Non Final Office Action mailed Mar. 1, 2012, 9 pgs.

U.S. Appl. No. 12/198,575, Notice of Allowance mailed Jun. 29, 2012, 12 pgs.

U.S. Appl. No. 12/198,575, Response filed May 31, 2012 to Non Final Office Action mailed Mar. 1, 2012, 9 pgs.

U.S. Appl. No. 13/236,304, Notice of Allowance mailed Jun. 11, 2012, 9 pgs.

U.S. Appl. No. 13/236,304, Response filed Feb. 7, 2012 to Non Final Office Action mailed Nov. 8, 2011, 6 pgs.

U.S. Appl. No. 13/291,146, Non Final Office Action mailed Apr. 13, 2012, 8 pgs.

U.S. Appl. No. 13/291,146, Notice of Allowance mailed Oct. 3, 2012, 11 pgs.

U.S. Appl. No. 13/291,146, Response filed Jul. 13, 2012 to Non Final Office Action mailed Apr. 13, 2012, 7 pgs.

U.S. Appl. No. 13/291,412, Non Final Office Action mailed Jun. 29, 2012, 8 pgs.

U.S. Appl. No. 13/291,412, Notice of Allowance mailed Dec. 11, 2012, 11 pgs.

U.S. Appl. No. 13/291,412, Preliminary Amendment filed Nov. 28, 2011, 7 pgs.

U.S. Appl. No. 13/291,412, Response filed Oct. 1, 2012 to Non Final Office Action mailed Jun. 29, 2012, 8 pgs.

U.S. Appl. No. 13/615,056, Non Final Office Action mailed Nov. 28, 2012, 4 pgs.

Australian Application Serial No. 2001271968, Office Action mailed Feb. 8, 2008, 1 pg.

European Application Serial No. 01951030.4, Summons to Attend Oral Proceedings Jul. 9, 2012, 7 pgs.

Japanese Application Serial No. 2002-508754, Office Action mailed Nov. 29, 2011, with English translation, 5 pgs.

Japanese Application Serial No. 2002-508754, Response filed Mar. 29, 2012 to Office Action mailed Nov. 29, 2011, with English translation of claims, 9 pgs.

* cited by examiner

AUTHORIZING USE OF A FINANCIAL INSTRUMENT

RELATED APPLICATIONS

This patent application is a Continuation of U.S. patent application Ser. No. 12/198,575 filed Aug. 26, 2008, which is a Continuation of U.S. patent application Ser. No. 09/901,594, filed Jul. 10, 2001 ("SYSTEM AND METHOD FOR VERIFYING A FINANCIAL INSTRUMENT"), which claims the benefit of the filing date of U.S. Provisional Application Ser. No. 60/217,202, filed Jul. 10, 2000 ("RANDOM ACCOUNT ACTIVITY TO VERIFY A CREDIT CARD"), the contents of which are incorporated by reference herein in their entirety.

BACKGROUND

This invention relates to the fields of computer systems and data communications. More particularly, a system and method are provided for verifying financial instruments or accounts, such as credit cards, debit cards, bank accounts, etc.

Modern financial systems make it easy to perform financial transactions without using physical currency. For example, credit cards and ACH (Automated Clearing House) transactions (i.e., electronic checks) are increasingly used in place of cash to make purchases, transfer money, or engage in other financial transactions.

These convenient instruments are, however, subject to theft and fraudulent use. A thief may obtain all the information needed to use a stolen credit card from the card itself, while all that is needed to conduct an ACH transaction (e.g., to withdraw money from a checking account) are the bank account and routing numbers from a check. It is then a simple matter for the thief or fraud artist to pose as the rightful owner or holder of a credit card or bank account. Existing safeguards against fraud (e.g., checking a credit card against a list of stolen cards, checking the name on a checking account before completing an ACH transaction) are often insufficient. It is typically the merchant, vendor, bank or other entity that accepts a credit card or electronic check transaction that is liable for the amount of money that is stolen or misappropriated if the rightful owner or holder is not at fault.

DETAILED DESCRIPTION

Figure 1:
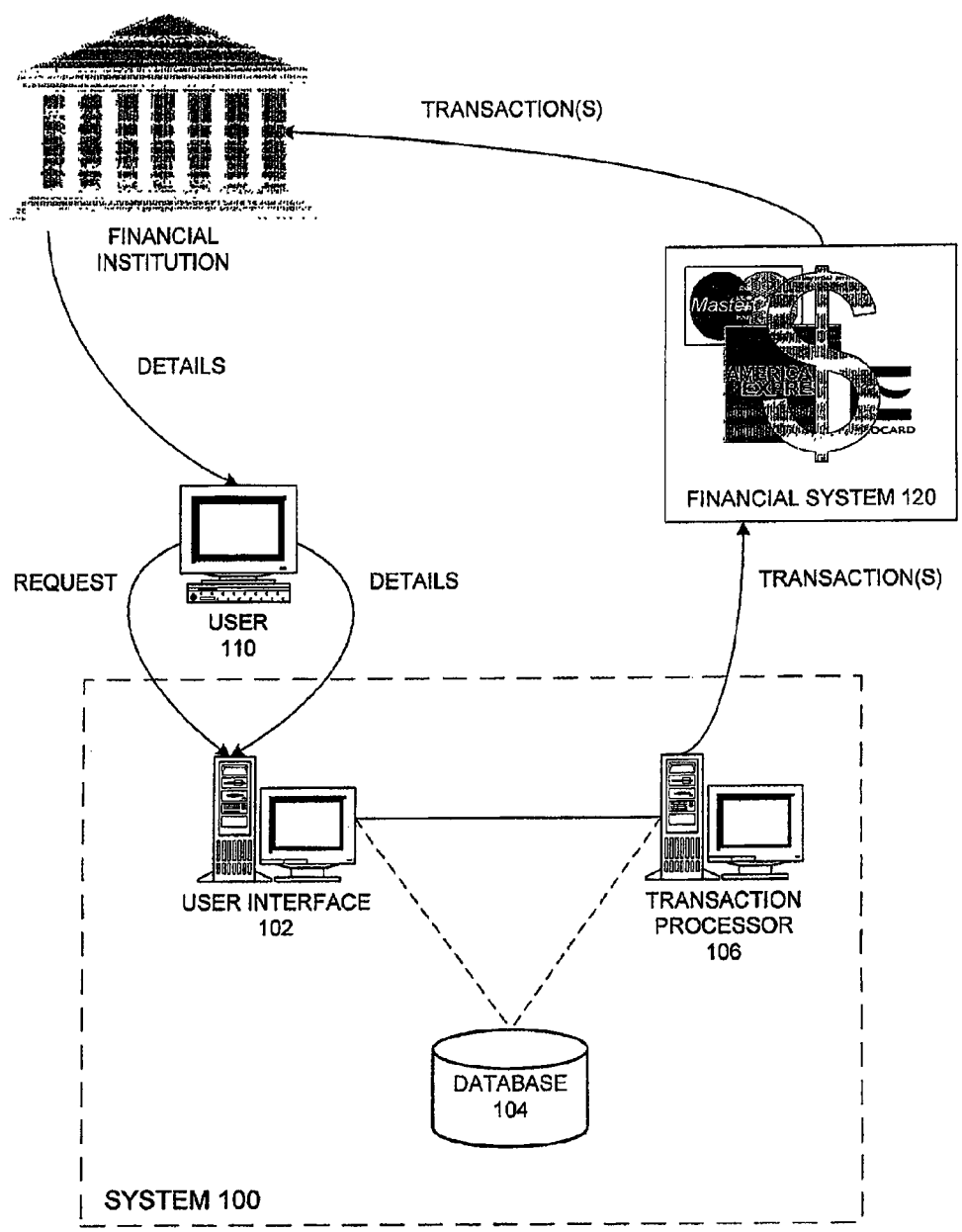
FIG. 1 is a block diagram of a system for verifying a potential user's authorization to use a financial instrument, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network or a publicly accessible network such as the Internet.

In one embodiment of the invention, a system and method are provided for verifying a financial instrument or account or verifying a user's authorization to use a financial instrument or account. A financial instrument or account may be defined to include credit cards, debit cards, bank accounts, brokerage accounts, money market accounts, and so on—virtually any entity that may be used as a source or destination of electronically exchanged value.

More particularly, a system and method of the invention may be applied to ensure that a financial instrument identified by a user (e.g., as a source of funds) is actually owned or controlled by the user. The likelihood or risk that the user has stolen the instrument, and is now attempting to use it fraudulently, may therefore be determined to be lower than if the verification was not performed.

In an embodiment of the invention, a series of transactions are performed using the instrument identified by the user. The transactions may include debits or credits to a credit card, deposits or withdrawals from a bank account, etc. Certain details of the transactions are recorded (e.g., amount, type of transaction, merchant identity, date or time of a transaction) and the user is invited to retrieve specified details (e.g., from an account statement, by calling the holder or issuer of the instrument) and identify them to the system. If the user correctly identifies the specified details, the verification process is successful. If the user is unsuccessful, he or she may be given a limited number of additional opportunities to input the correct details and, if still unsuccessful, may be barred from using the instrument. In this embodiment, the user is required to pass his or her financial institution's own verification/authentication process in order to obtain the necessary details of the transactions, thereby making it even less likely that he or she is a fraudulent user.

An embodiment of the invention may be used or applied for various reasons or in various situations. For example, a merchant may initiate or implement a verification process when a customer wishes to make a purchase (e.g., if the customer is new or if the cost of the purchase is relatively large). The customer may be able to rapidly retrieve the necessary details of the verification transactions by accessing them on-line (e.g., through a web site of her credit card issuer or bank) or by telephone.

Another embodiment of the invention may be applied to prospectively verify a user's authority to use a financial instrument. For example, an on-line system may allow users to make fund transfers and/or purchases on-line. A user may identify a financial instrument that he would like to use but the on-line system may require the financial instrument, or the user's authorization to use the instrument, to be verified before allowing the user to use it in the system.

FIG. 1 depicts a system for verifying a user's control of or authorization to use a financial instrument, according to one embodiment of the invention. In this embodiment, system 100 includes user interface 102, database 104 and transaction processor 106. User interface 102 may operate on a web server, application server, data server or other computing device. In an alternative embodiment of the invention a user may interact with the system via a human agent or representative of the system, an interactive voice recorder or other means, in addition to or instead of user interface 102. Database 104 may be separate from or integrated with user interface 102 or the computer system on which the user interface executes. Transaction processor 106 may be configured for initiating transactions for one or more different types of financial instruments or, alternatively, system 100 may include multiple transaction processors, in which case the capabilities of each may or may not overlap.

User interface 102 is configured to receive user connections, such as from user 110, and may operate differently (e.g., display different web pages, forms or menus) depending on a user's status. For example, for a connection from a new user, interface 102 may present the user with a registration form, information about services offered by the system (e.g., electronic commerce, fund transfers), etc. A registration form may require the user to identify one or more financial instruments, any of which may then be verified according to an embodiment of the invention. For registered or other experienced users, interface 102 may present customized pages or displays, electronic commerce opportunities, etc. Such a user may be invited to identify a financial instrument or account for immediate or future use as a source or destination of funds. User interface 102 may be configured to accept connections via publicly available networks (e.g., the Internet), private networks and other dedicated or shared links, which may be wired or wireless.

Transaction processor 106 is coupled to one or more financial systems or entities for processing financial transactions. Thus, financial system 120 may comprise an ACH (Automated Clearing House) vendor (e.g., a Treasury Management Service configured to handle ACH transactions such as electronic checks and deposits), a merchant acquirer or Treasury Management Service that handles credit card and/or debit card transactions, or some other entity. As specified above, system 100 may include multiple transaction processors. Each transaction processor may be configured for a different type of financial instrument and may interact with a different financial system or entity. Transaction processor 106 may be a separate or specialized element of system 100 (e.g., a computer server) or may be incorporated into another element of the system (e.g., a data server, web server).

Financial system 120 is coupled to the user's financial institution corresponding to the financial instrument being verified. Financial institution 130 may therefore be the user's bank, credit card issuer, brokerage, investment manager, etc. Financial system 120 may, in an embodiment of the invention, represent a collection of financial institutions and entities that communicate with each other by specified formats (e.g., for credit card, debit card and/or ACH transactions). Thus, financial system 120 may comprise financial institution 130.

In one method of verifying a user's financial instrument or account through system 100, user 110 connects to system 100 and identifies an instrument or account that he or she would like to use (e.g., as a source of funds for purchases or money transfers). User interface 102, or the server operating the user interface, passes the identifying information to transaction processor 106. Transaction processor 106 initiates one or more transactions, using variable details such as an amount of the transaction, type of transaction (e.g., deposit, withdrawal, debit, credit), different vendor names or identities, or other details that may be reported to or retrieved by a valid user or owner of the instrument. The transaction may be generated or constructed by user interface 102, transaction processor 106 or some other entity within system 100 (e.g., an application or data server). The generating entity also saves selected details of the transaction(s) to database 104.

Transaction processor 106 then initiates the series of transactions through appropriate financial systems or entities (e.g., financial system 120), which execute the transaction(s) in conjunction with the user's financial institution 130. Thus, the transaction processor takes information regarding the transactions(s), changes it into a form that financial system 120 can understand or use, and then interacts with or otherwise passes it to the financial system.

User 110 obtains details of the transaction(s) from a statement from institution 130, from an on-line system provided by the institution, by calling the institution, etc. User 110 then re-connects to system 100 (e.g., through user interface 102) and provides the requested details. The system compares the details provided by user 110 with the stored details and, if they match, authorizes or allows the user to use the instrument or take other desired action that may otherwise be prevented or denied. A more comprehensive method of the invention is described below in conjunction with FIG. 2.

One result of implementing an embodiment of the invention may be to reduce fraud rates, charge-backs, rejections, etc., in order to reduce the cost of business for merchants and other entities. A merchant that accepts credit cards, debit cards, electronic checks or other instruments that can be verified through a method of the invention may perform such verification for all users, just for users deemed high risk, or for some other group of users. For example, if the merchant calculates or otherwise obtains a level of risk presented by a user, that level may determine whether the user presents a low enough risk that verification is unnecessary, high enough to warrant verification, or so high that the user should be rejected without even attempting to verify the user's selected instrument.

Because the identity of a vendor (e.g., merchant) involved in a financial transaction is typically reported to a user, the specific vendor account or name used to perform a verifying transaction may be one of the details required of a user in order to verify a financial instrument. Thus, the entity (e.g., merchant, vendor, on-line service) performing or implementing a method of the invention may establish a number of vendor accounts with its merchant acquirer, credit card issuer or the bank or other institution through which it will initiate ACH and/or other transactions. Alternatively, instead of requiring separate accounts, the entity's bank, merchant acquirer or other financial system partner may allow the entity to specify a merchant name, account, or other detail to be part of the transaction.

Advantageously, the use of variable or different merchant names facilitates the use of an embodiment of the invention internationally. In particular, even if the verifying transactions are initiated in one currency and, at the user's end are converted into another currency, the merchant name or other variable identity can still be used as a verifying detail.

If the manner in which verification transactions are handled causes some of the transaction information to be truncated or excised, the verification system (e.g., system 100 of FIG. 1) may structure transactions accordingly or take that handling into account when comparing stored transaction details against the details offered by a user. For example, if it is likely that part of a vendor name or account will be truncated, then that portion of a transaction may be reported in a way that prevents truncation of disambiguating information (e.g., by using a vendor name of "2468AcmeCorporation" instead of "AcmeCorporation2468"). Then, as long as the user can provide the "2468Acme" portion, this may be considered to match the account name.

Figure 2:
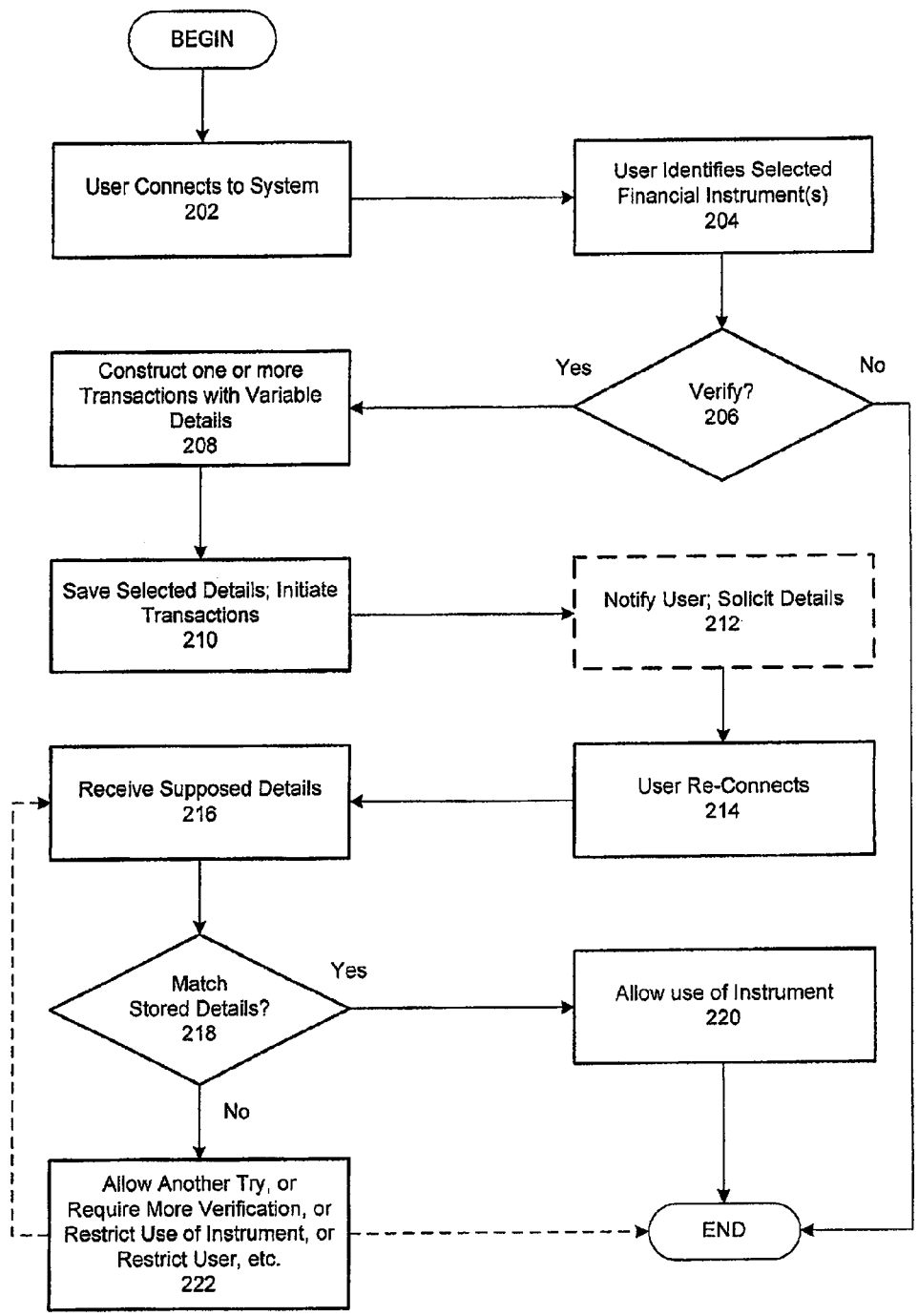
FIG. 2 is a flowchart illustrating one method of verifying a person's authorization to use a financial instrument, in accordance with an embodiment of the invention.

FIG. 2 demonstrates one method of verifying a user's specified financial instrument or verifying the user's authority to use the instrument, according to one embodiment of the invention. In this embodiment, a user selects a credit card, debit card, bank account or other account that offers electronic checking or deposits, to be the source of funds for purchases, money transfers or other transactions at a merchant (or other entity).

In order to use variable or different merchant or vendor names/accounts for verifying transactions (as described above), the merchant may, prior to the illustrated method, establish multiple accounts with its credit card issuer or ACH vendor.

In state 202 of the method of FIG. 2, a user (or a user's agent) connects to the verification system, which may be implemented as part of an on-line or traditional merchant or, another entity that accepts payment in forms other than physical currency. This connection may be the user's initial contact with the system, in which case he or she may (or may be required to) verify a source of funds as part of a registration process. Or, this may be just one of many visits, but the user may be requesting a transaction (e.g., a purchase or fund transfer) that requires verification.

In state 204, the user identifies one or more financial instruments (e.g., credit cards, debit cards, bank accounts, charge cards) or other sources of funds. Such an instrument or source may not be the one that the user is attempting, or desires, to use for a particular transaction. In particular, verifying any financial instrument or source of funds associated with the user may reduce the risk that he or she is a fraudulent user. Illustratively, the user may be required to provide (where applicable) an account name or number, the name of the registered owner/user, a physical (e.g., street) address associated with the instrument or account, a telephone number, a password or PIN, etc. In this embodiment of the invention, some or all of the electronic communications involving the system that contain financial or private data may be encrypted or otherwise protected.

In state 206 the system determines whether verification is required before the user may use an identified financial instrument. This determination may be made on the basis of various risk factors and fraud profiles, which may differ in different embodiments of the invention. For example, if any of the information provided by the user does not correspond with the identified instrument, this may indicate higher risk and the need for verification. Some other risk factors may include: a recently changed address or telephone number associated with the instrument, the time of day during which the user has connected, the number or amount of transactions the user wants to perform, the user's electronic address (e.g., IP—Internet Protocol) and whether it corresponds with his or her asserted physical address, and virtually any other activity that may be indicative of a risky or fraudulent user. Illustratively, domestic (i.e., United States) credit card users may not be subjected, in one embodiment of the invention, to verification of their credit cards, whereas all international users may require verification. Similarly, all bank accounts or other sources of electronic checks or debits may be deemed to require verification. If verification is required, the illustrated method continues at state 208; otherwise, the method ends.

In state 208, the system (e.g., a user interface, web or application server, transaction processor) generates a series of one or more verifying transactions involving the identified financial instrument. Certain details may vary from one transaction to another, thereby decreasing the likelihood that the user could guess them. Illustrative variable details include the number of transactions, type of transaction (e.g., deposit or withdrawal, debit or credit), amount of the transaction, merchant name or account used in the transaction, etc.

In one embodiment of the invention, a typical series of verifying transactions may include two deposits (to a bank account) or credits (to a credit card), each of which is between $0.01 and $0.99 in value, and may involve different merchant identities (e.g., 1234XYZCorporation, 5160XYZCorporation). To decrease the cost of performing transactions in this embodiment, one or both of the deposit/credit amounts may be biased toward the lower end of the value range.

In state 210, selected details (e.g., all or a subset of the variable details) of the transactions are saved (e.g., stored in a database) and the transactions are initiated (e.g., through transaction processors coupled to the appropriate financial systems or entities). The verifying transactions may be initiated all at the same time, may be separated in time or sent through different financial systems or entities. Also, the verifying transactions may be joined with other transactions (e.g., a verifying deposit may be merged with a subscription fee being charged to the user), in which case details of the merged transactions would be saved for comparison with the details reported by the user.

In optional state 212, the user may be notified (e.g., via electronic mail) that he or she should wait for or retrieve evidence of the transactions. The user may be notified when, or shortly after, the transaction is initiated. Or, the user may be notified after enough time has passed for the transaction to be completed.

The user's evidence of the transaction(s), which should include all or a subset of the details of the transaction(s), may be in the form of a monthly statement mailed to the user from his or her financial institution. Or, the user may take a more proactive approach and access his or her instrument or account status on-line or via telephone. In some manner, the user obtains information regarding the transaction(s).

In state 214 the user (or an agent of the user) connects to the system and, in state 216, proffers or provides supposed details of the verifying transaction(s). Illustratively, the system (e.g., a user interface) may prompt the user to enter the amount of each transaction, the merchant name (or the variable part thereof), the type of transaction, and/or any other detail that was stored.

In this embodiment, the system is configured to communicate with the user through a user interface. However, in alternative embodiments the user may be able to interact with human operators for all or any part of the verification process.

In state 218 the system compares the stored details to the details proffered by the user. If they match (e.g., if the stored details include the proffered details) the illustrated method continues at state 220. Otherwise, the method proceeds to state 222.

In state 220, the system approves the user's use of the identified financial instrument, or allows some action that was previously disallowed due to questionable risk levels, and the method ends.

In state 222, verification failed, in which case the user may be allowed to re-enter supposed details (e.g., up to some maximum number of times) or may have to provide different verification (e.g., by submitting a copy of a statement regarding the instrument—such as a monthly statement from the user's financial institution). Or, the system may restart the verification process, restrict the user's activity or use of the instrument, etc. the method may therefore end or return to a previous state.

In one embodiment of the invention, if a user for whom a series of verifying transactions have been initiated does not return to the system to submit details of the transactions within a predetermined period of time (e.g., five days, two weeks, one month), he or she may be contacted (e.g., via electronic mail and/or telephone) and prompted to complete the process.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method comprising:
   presenting, using at least one processor, via a user interface, a registration form to a user, the registration form to receive identification of one for more financial instruments;
   receiving, from the user, using at least one processor, the identification of the one or more financial instruments;
   initiating, using at least one processor, at least one transaction using a variable detail;
   saving the variable detail in a database as a stored detail;
   receiving, from the user, using at least one processor, a requested detail relating to the at least one transaction;
   comparing, using at least one processor, the stored detail with the requested detail; and
   authorizing, using at least one processor, use of the at least one financial instrument based on the stored detail matching the requested detail.

2. The method of claim 1, wherein the registration form is to receive identification of one or more financial instruments to be used for at least one of immediate use and future use.

3. The method of claim 1, wherein the registration form is to receive identification of the one or more financial instruments as at least one of a source of funds or a destination for funds.

4. The method of claim 1, comprising initiating at least one transaction through a financial system.

5. The method of claim 4, wherein the initiating of the at least one transaction through the financial system includes formatting information regarding the at least one transaction into a form usable by the financial system.

6. The method of claim 1, wherein:
   the at least one transaction is initiated on behalf of a vendor; and
   the variable detail includes a vendor identifier, the vendor identifier identifying the vendor.

7. The method of claim 6, wherein the vendor identifier comprises at least one of a vendor account or a vendor name.

8. The method of claim 1, wherein the variable detail includes at least one of a type of the least one transaction.

9. The method of claim 1, wherein a financial instrument from the one for more financial instruments is associated with at least one of a credit card account, a debit card account, and a checking account.

10. The method of claim 1, wherein said authorizing comprises:
    receiving a subsequent transaction, the subsequent transaction identifying a source; and
    transferring funds to the financial instrument from the one for more financial instruments from the source.

11. A system comprising:
    a memory; and
    at least one processor coupled to the memory, the at least one processor;
    a user interface, the user interface to:
       present a registration form to a user, the registration form to receive identification of one for more financial instruments,
       receive, from the user, the identification of the one or more financial instruments,
       receive, from the user, a requested detail relating to at least one transaction; and
    a transaction processor to:
       initiate the at least one transaction using a variable detail,
       save the variable detail in a database as a stored detail,
       compare the stored detail with a requested detail, and
       authorize use of the at least one financial instrument based on the stored detail matching the requested detail.

12. The system of claim 11, wherein the registration form is to receive identification of one or more financial instruments to be used for at least one of immediate use and future use.

13. The system of claim 11, wherein the registration form is to receive identification of the one or more financial instruments as at least one of a source of funds or a destination for funds.

14. The system of claim 11, wherein the transaction processor is to initiate the at least one transaction through a financial system.

15. The system of claim 14, wherein the transaction processor is to format information regarding the at least one transaction into a form usable by the financial system.

16. The system of claim 11, wherein:
    the transaction processor is to initiate the at least one transaction on behalf of a vendor; and
    the variable detail includes a vendor identifier, the vendor identifier identifying the vendor.

17. The system of claim 16, wherein the vendor identifier comprises at least one of a vendor account or a vendor name.

18. The system of claim 11, wherein the variable detail includes at least one of a type of the least one transaction.

19. The system of claim 11, wherein a financial instrument from the one for more financial instruments is associated with at least one of a credit card account, a debit card account, and a checking account.

20. A machine-readable non-transitory storage medium having instruction data to cause a machine to:
    present a registration form to a user, the registration form to receive identification of one for more financial instruments,
    receive, from the user, the identification of the one or more financial instruments,
    initiate at least one transaction using a variable detail, save the variable detail in a database as a stored detail,
receive, from the user, a requested detail relating to the at least one transaction,
compare the stored detail with the requested detail, and
authorizing use of the at least one financial instrument based on the stored detail matching the requested detail.

\* \* \* \* \*

UNITED STATES PATENT AND TRADEMARK OFFICE
CERTIFICATE OF CORRECTION

| | | |
|---|---|---|
| PATENT NO. | : 8,515,871 B2 | Page 1 of 1 |
| APPLICATION NO. | : 13/291398 | |
| DATED | : August 20, 2013 | |
| INVENTOR(S) | : Templeton et al. | |

It is certified that error appears in the above-identified patent and that said Letters Patent is hereby corrected as shown below:

In the Claims

In column 8, line 4, in claim 9, delete "for" and insert --or--, therefor

In column 8, line 12, in claim 10, delete "for" and insert --or--, therefor

In column 8, line 19, in claim 11, delete "for" and insert --or--, therefor

In column 8, line 57, in claim 19, delete "for" and insert --or--, therefor

In column 8, line 63, in claim 20, delete "for" and insert --or--, therefor

Signed and Sealed this
Eighteenth Day of February, 2014

Michelle K. Lee
*Deputy Director of the United States Patent and Trademark Office*